July 12, 1938.  K. D. LOOSE ET AL  2,123,703
DOUGH PREPARING MACHINE
Original Filed Oct. 2, 1935  6 Sheets-Sheet 1
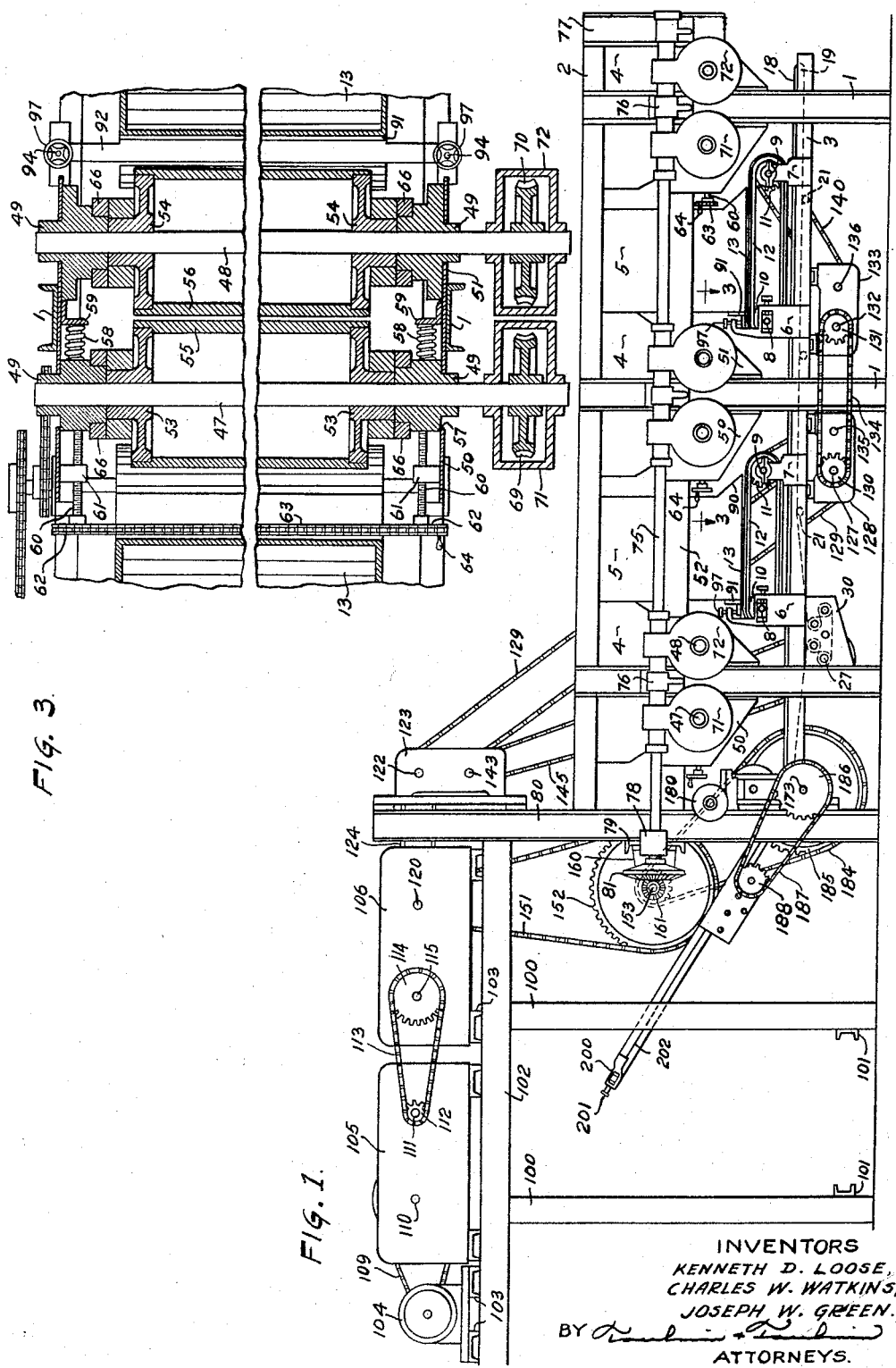
INVENTORS
KENNETH D. LOOSE,
CHARLES W. WATKINS,
JOSEPH W. GREEN.
BY
ATTORNEYS.

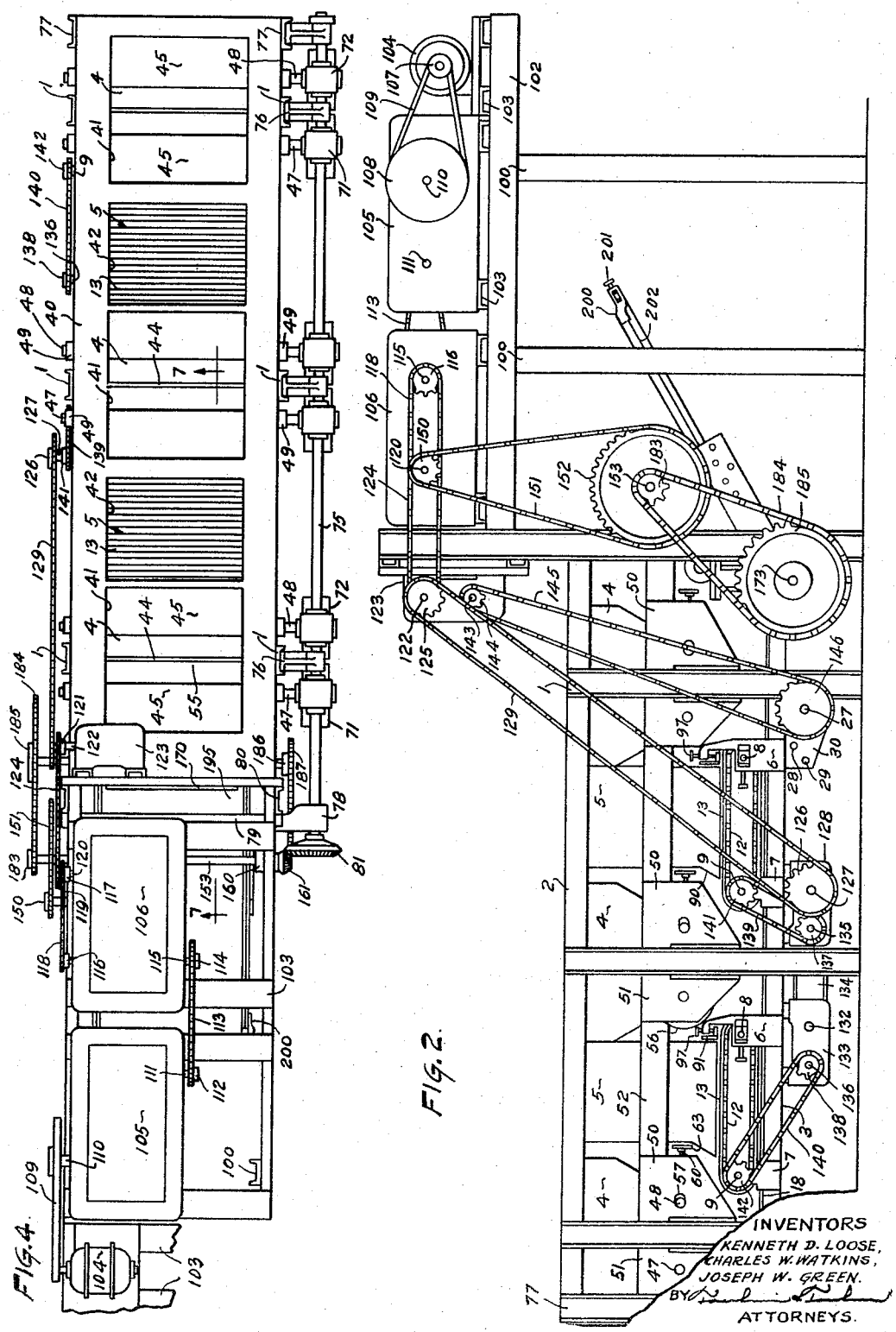

July 12, 1938.   K. D. LOOSE ET AL   2,123,703
DOUGH PREPARING MACHINE
Original Filed Oct. 2, 1935   6 Sheets-Sheet 3

INVENTORS
KENNETH D. LOOSE,
CHARLES W. WATKINS,
JOSEPH W. GREEN.
BY
ATTORNEYS.

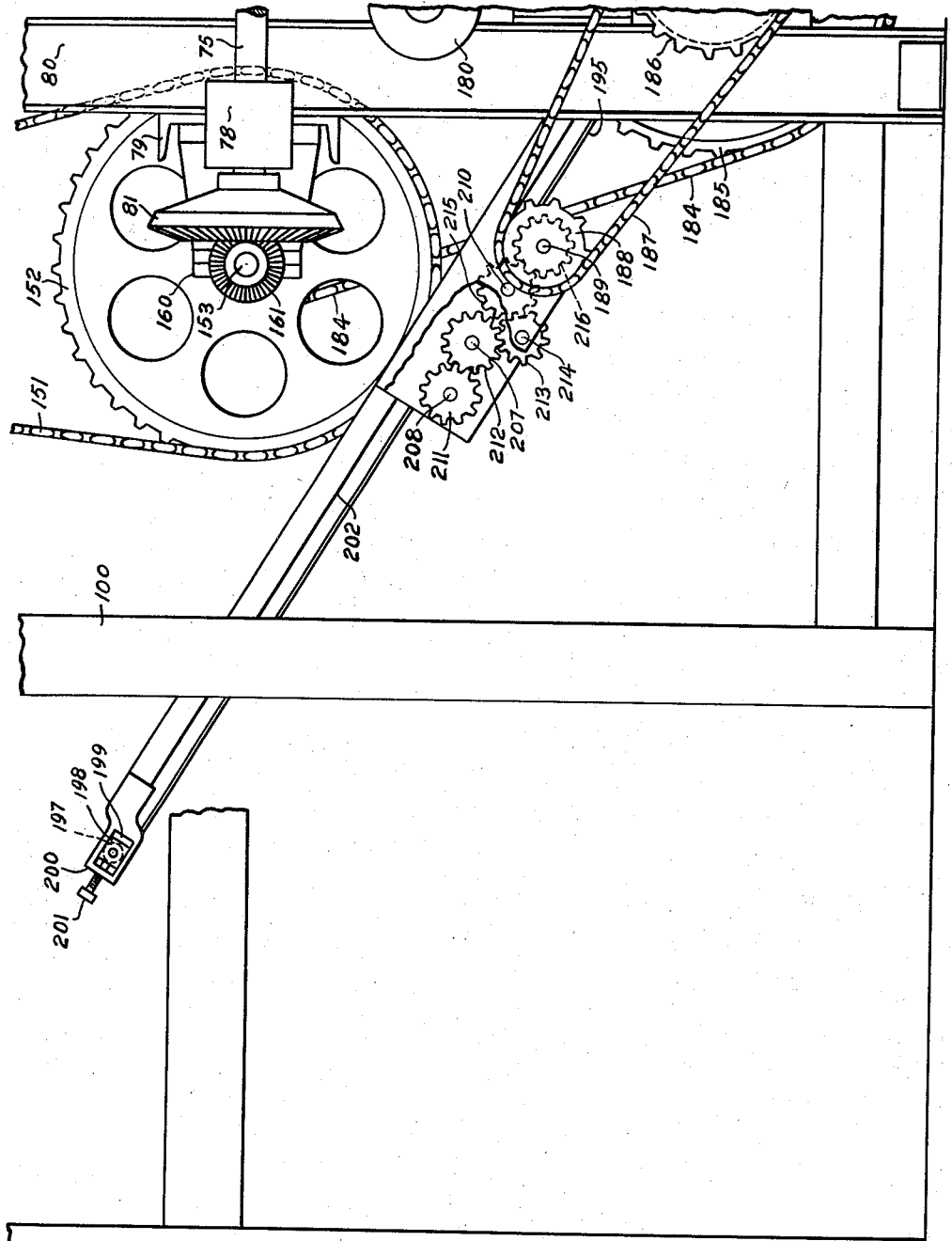

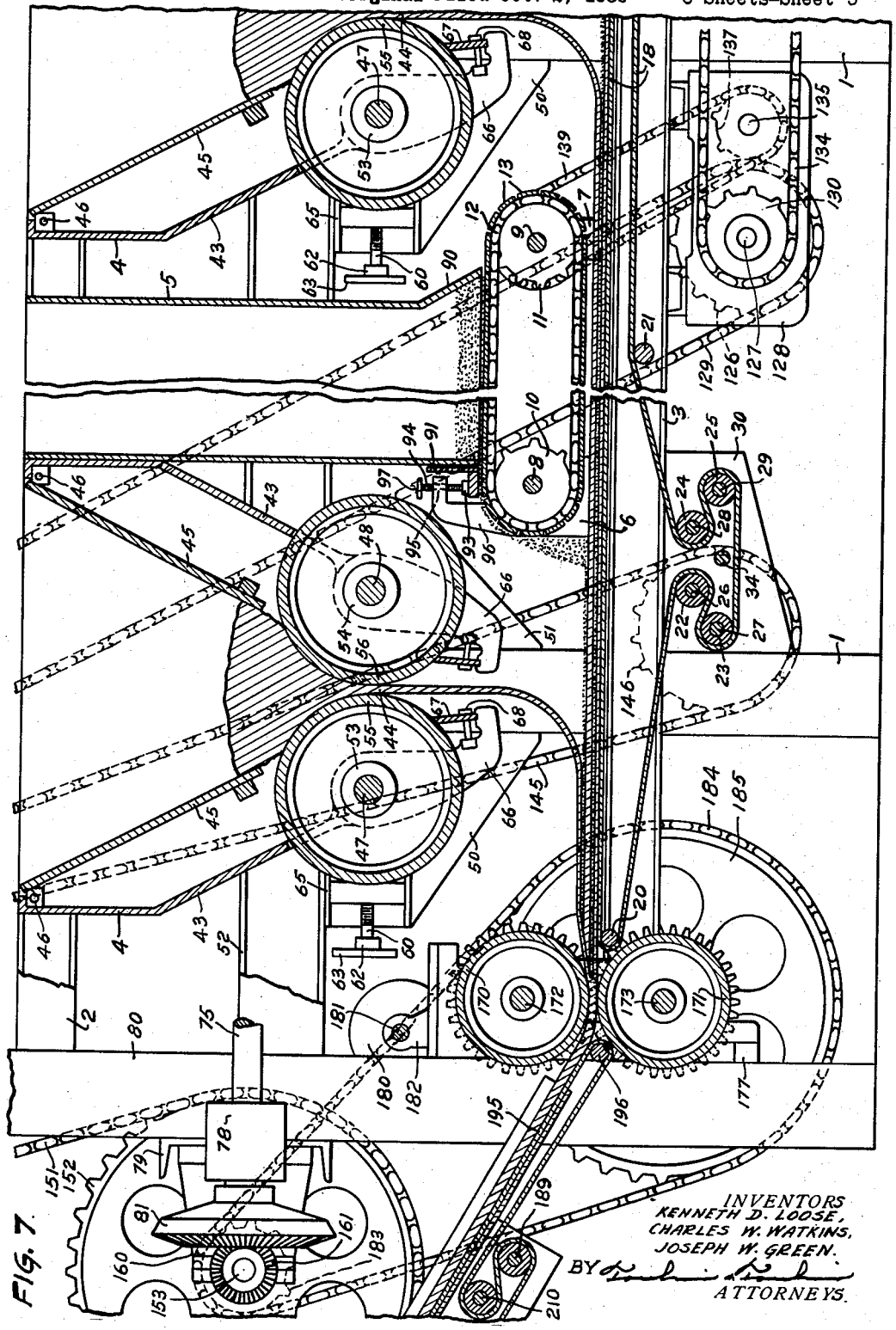

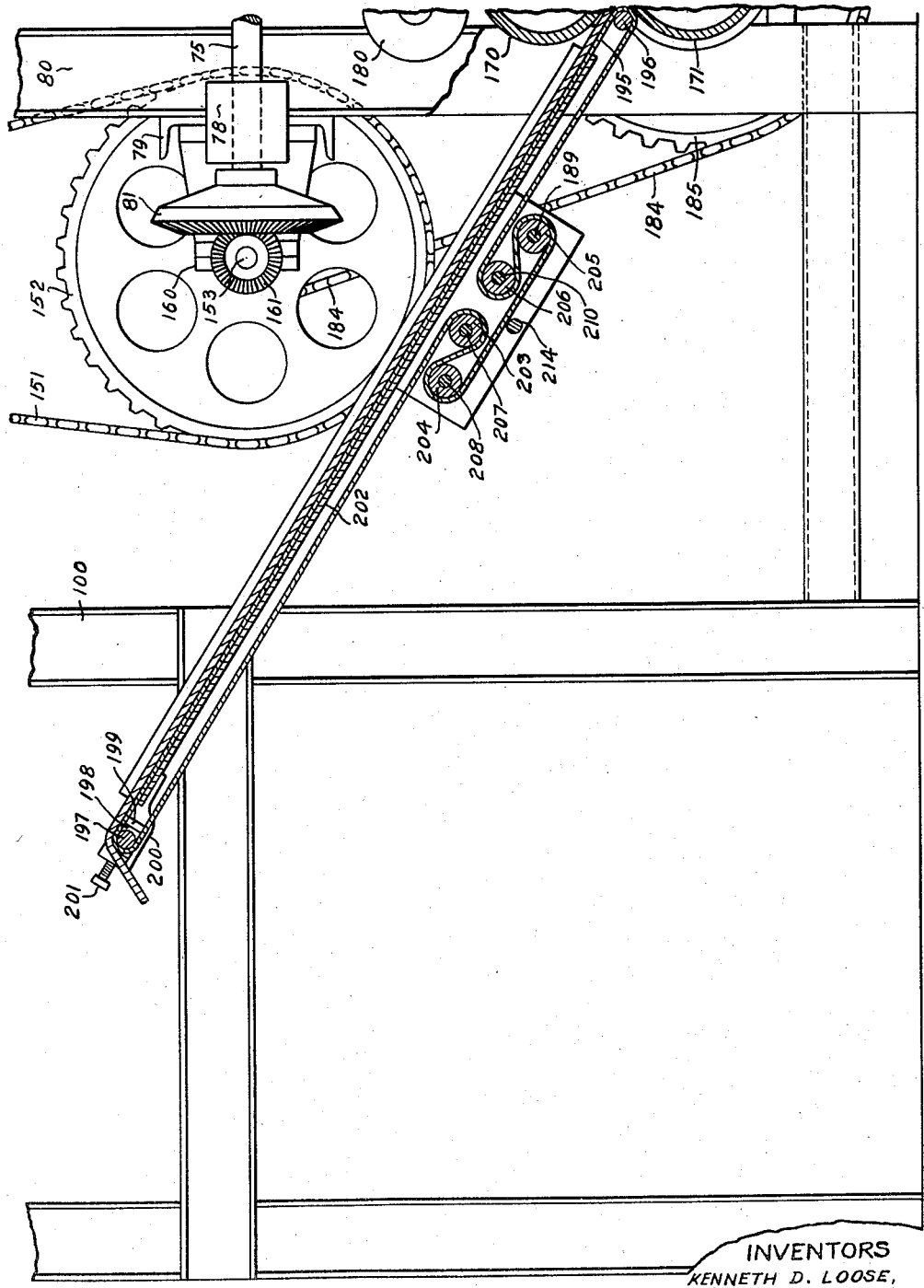

Patented July 12, 1938

2,123,703

UNITED STATES PATENT OFFICE 2,123,703

DOUGH PREPARING MACHINE

Kenneth D. Loose, Bronxville, N. Y., Charles W. Watkins, and Joseph W. Green, Dayton, Ohio, assignors to Loose-Wiles Biscuit Company, Long Island City, N. Y., a corporation of New York Original application October 2, 1935, Serial No. 43,246. Divided and this application March 1, 1937, Serial No. 128,439

4 Claims. (Cl. 107—1)

This invention relates to machinery for use in bakeries, and in particular, to machines used in the preparation of dough prior to the baking operations.

One object of this invention is to provide a machine for combining dough with certain ingredients, known as enrichments, to form a laminated product, in sheet form, consisting of a plurality of layers of dough and enrichments.

Another object is to provide devices for sealing the edges of the laminated dough sheet prior to the lapping operations.

Another object is to provide a dough preparing machine having dough holders and an enrichment material holder together with an auxiliary conveyer for depositing the enrichment material upon the dough layers as they are moved along by a main conveyor.

Another object is to provide a dough preparing machine as immediately described above wherein the auxiliary conveyor moves in a direction parallel with the main conveyor.

This application is a division of our co-pending application, Serial No. 43,246, filed October 2, 1935, which has matured into United States Patent No. 2,076,657, dated April 13, 1937.

In the drawings:

Figure 1 is a side elevation of the laminating section of the machine, together with the first lapping section thereof.

Figure 2 is a side elevation of the machine shown in Figure 1, but looking from the opposite side thereof.

Figure 3 is a horizontal section through the hopper feed rollers, taken along the line 3—3 of Figure 1.

Figure 4 is a plan view of the machine.

Figure 6 is an enlarged side elevation, partly broken away, of the first transfer conveyor of the machine.

Figure 7 is a vertical section through the laminating part of the machine shown in Figure 5, taken along the line 7—7 of Figure 4.

Figure 8 is a side elevation, partly in vertical section through the first transfer conveyor of the machine.

General construction

Figure 5:
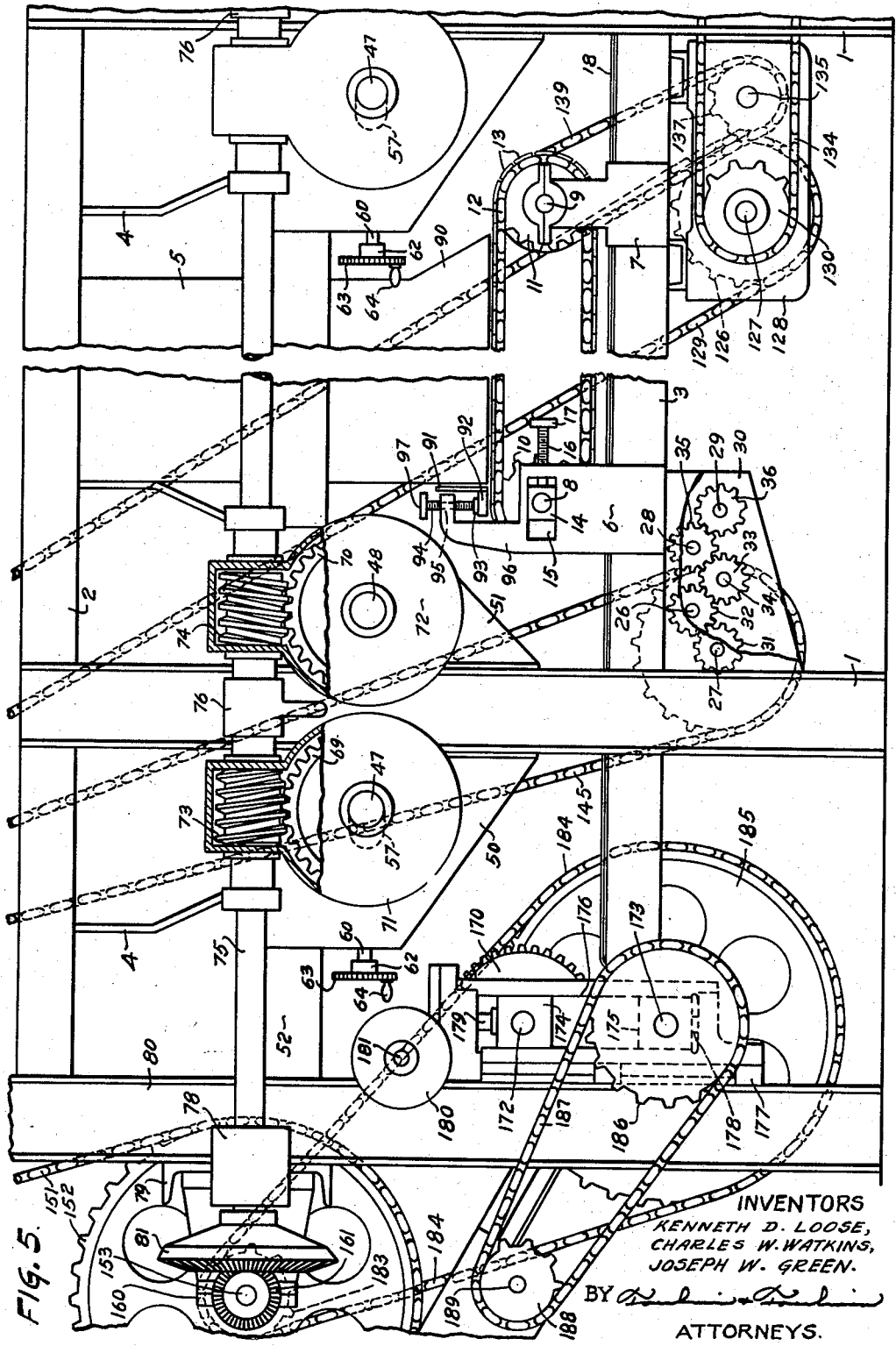
Figure 5 is an enlarged side elevation, partly broken away, of a portion of the laminating section of the machine.

In general, the machine of this invention comprises a series of hoppers arranged in sequence and adapted to deposit dough and enriching materials upon a moving conveyor, thereby producing a long strip or sheet of dough in laminated form, and having alternate layers of dough and enrichment. The laminated sheet thus formed is fed between rollers with beveled edges in such a manner as to cause the edges of the dough sheet to be sealed, thereby preventing the escape of the enrichment materials. The dough sheet is further fed into other apparatus in which further operations are carried out which are beyond the scope of the present invention.

The machine of this invention produces a laminated dough which may be used for a large variety of products, such as crackers, cookies and various types of wafers or biscuits. The purpose of the lamination is to distribute the enrichment materials throughout the dough without requiring the undue working or mixing of the dough, such operations detracting from the quality of the baked product obtained from said dough.

Hitherto, in producing baked articles of the type produced by the present machine, the dough and enrichment materials were prepared in batches and mixed together, either in mixing machines or by hand. The enrichment materials may be of a variety of kinds, such as fats, cheese, flavoring materials, or other materials of a different character than the dough. By the present invention this mixing and repeated working of the dough are avoided, a superior effect being obtained by the lamination of the dough with the enrichment materials between the dough layers, this being afterward lapped, overlapped and rolled a plurality of times by other apparatus (not shown) until the final product comprises an article with a large number of thin layers of alternate dough and enrichment material. Such apparatus is described and claimed in our previously mentioned application, Serial No. 43,246 filed October 2, 1935, of which this is a division, and which has matured into United States Patent No. 2,076,657, dated April 13, 1937.

By this arrangement it is possible to employ a series of doughs having different characteristics. For example, the outer layers of dough may have firm characteristics, whereas the middle layer of dough may be too rich to form into an ordinary sheet of dough. By thus placing the rich layer between the outer layers the rich layer is given the necessary support, and with the layers of enriching materials enables a superior product to be made than could be prepared by the ordinary processes and apparatus. The number of times the sheet is overlapped by the lapping device can be regulated by varying the relative speeds of the lapping device and the conveyor upon which the sheet of dough is deposited. The result is a sheet of dough of lighter consistency than the prior art mixing methods and apparatus produce.

Laminating mechanism

The laminating portion of the machine is shown at the right-hand side of Figure 1, and comprises vertical frame members 1 interconnected by longitudinal top and bottom frame members 2 and 3, connected by suitable cross members. In the framework thus formed is mounted an alternate series of dough hoppers 4 and enrichment hoppers 5. In the embodiment of the invention shown and described there are three dough hoppers 4 and two enrichment hoppers 5 arranged between the dough hoppers. Mounted upon the lower frame members 3, as by the supports 6 and 7, are shafts 8 and 9 carrying sprockets 10 and 11 (Figures 1 and 5) upon which an endless enrichment conveyor 12 operates.

The endless enrichment conveyor 12 consists of interconnected slats 13 moving in an orbital path between the shafts 8 and 9, around the sprockets 10 and 11, the upper section of this conveyor passing immediately beneath the enrichment hopper 5. One of these conveyor assemblies is arranged beneath each enrichment hopper 5. The shaft 8 is arranged in bearing blocks 14, which are movable to and fro in rectangular slots 15, under the influence of the screw shaft 16 and the hand wheel 17. By turning the hand wheel 17 the conveyor 12 may be made tighter or looser, as the particular working conditions demand. The driving arrangement for the enrichment conveyor 12 will be subsequently described.

Also mounted upon the longitudinal frame members 3 and supported therebetween is the dough-laminating conveyor 18, supported at the right-hand end of the machine upon the roller 19 journalled upon the longitudinal frame members 3. The dough-laminating conveyor 18 is of the endless type, its upper section extending horizontally along the longitudinal frame members 3 from the right-hand to the left-hand ends thereof, the left-hand end being supported by the roller 20 (Figure 7), also journalled in and between the longitudinal frame members 3. The dough-laminating conveyor 18 is supported at intermediate points along its path by guide rollers 21 (Figure 7). At a point near its left-hand end (Figures 5 and 7) the dough-laminating conveyor 18 passes around rollers 22, 23, 24 and 25, secured to the shafts 26, 27, 28 and 29 respectively. The ends of these shafts are journalled in the frame members 30 secured to the longitudinal frame members 3 and vertical frame members 1, and are drivingly interconnected by gearing. The shaft 27 (Figure 5) carries a pinion 31 meshing with a pinion 32 upon the shaft 26. This, in turn, meshes with a pinion 33 mounted upon the shaft 34. The pinion 33 meshes with a pinion 35 upon the roller shaft 28, and this in turn, meshes with a pinion 36 mounted upon the roller shaft 29. By this means the dough-laminating conveyor 18 is positively driven from the shaft 27, the remaining driving connections of which will be subsequently described.

The top of the laminating section of the machine (Figure 4) is provided with a platform 40, which has apertures 41 leading into the dough hoppers 4 and apertures 42 leading into the enrichment hoppers 5. The dough hoppers 4 consist of bins extending downwardly from the platform 40 and aperture 41, and are provided with sloping walls 43 leading to a delivery aperture 44 at the bottom of each hopper (Figure 7). Secured to the opposite side walls of the dough hoppers 4 (Figure 7) are adjustable guide plates 45, pivotally mounted, as at 46, upon the side walls. At the lower extremities of the sloping walls 43 are the roller shafts 47 and 48, these being journalled in the bearing blocks 49 (Figure 3), mounted in the channel members 65, respectively, (Figure 7). The side plates 50 and 51 are secured to the frame uprights 1 and the middle longitudinal frame members 52.

On the shafts 47 and 48 are mounted the hubs 53 and 54 of the hopper feed rollers 55 and 56, respectively. The spacing between the peripheries of the hopper feed rollers 55 and 56 may be varied. This is accomplished by having the bearing block 49 horizontally movable within elongated apertures 57. The bearing blocks 49 are urged to the left (Figure 3) by the coil springs 58, having their opposite ends resting against the angle members 59 secured to the channel members 65 and the side plates 51. On their opposite sides the bearing blocks 49 are engaged by the screw shafts 60, threaded through the posts 61 mounted on the channel members 65 and the side plates 50 and carrying the sprockets 62, interconnected by the sprocket chain 63.

One of the sprockets 62 is provided with a hand crank 64 by which both sprockets 62 and both screw shafts 60 may be simultaneously rotated. When this is done the bearing blocks 49 and the hopper feed roller 55 are caused to move to and fro, thus causing the space between the hopper feed rollers 55 and 56 to be varied, as desired. During their reciprocation the bearing blocks 49 are supported in the channel members 65 (Figure 7) and the side plates 50.

The bearing blocks 49 serve to support scraper arms 66, to the outer ends of which are attached the scrapers 67, as by the cap screws 68 (Figure 7). The scrapers 67 serve to prevent dough from passing completely around the peripheries of the hopper feed rollers 55 and 56. The roller shafts 47 and 48 on their outer ends carry worm gears 69 and 70 within the housings 71 and 72 (Figures 5 and 3). Meshing with the worm gears 69 and 70 are the right-hand and left-hand worms 73 and 74, respectively. The worms 73 and 74 are mounted upon the hopper drive shaft 75, this being journalled in bearing brackets 76 secured to the frame uprights 1 and also to the end frame upright 77 (Figures 1 and 4). At its left-hand end the hopper drive shaft 75 is journalled in the bearing bracket 78 secured to the frame cross member 79, which in turn, is secured to the frame end upright 80 (Figures 1 and 4). Beyond the bearing bracket 78 the hopper drive shaft 75 is provided with a bevel gear 81, which provides the driving connection therefor. The remainder of the driving connections will be subsequently described.

The enrichment hoppers 5 are in the form of rectangular bins extending downwardly from the platform apertures 42 (Figures 4, 5 and 7), and are provided at one end with an outwardly flared side wall 90. The bottom of each enrichment hopper 5 is open so as to discharge the contents of the hopper directly onto the upper surface of the enrichment conveyor 12. The quantity of enrichment materials deposited upon the enrichment conveyor 12 is regulated by the gate 91, having an arm 92 carrying a bearing 93, which rotatably receives the lower end of the screw shaft 94. The screw shaft 94 passes through a threaded bore 95 in the bracket portion 96 of the support 6. The screw shaft 94 at its upper end is provided with a hand wheel 97, by the turning of which the gate 91 is raised or lowered, thus regulating the thickness of the enrichment layer deposited upon the conveyor 12.

Main driving mechanism

The main driving mechanism (Figures 1, 2, 3 and 4) is mounted upon the top of the left-hand end of the machine, as shown in Figure 1. This left-hand end comprises a framework having vertical uprights 100 interconnected by cross members 101, and having the top members 102 serving to support the top cross members 103 (Figures 1 and 2). The top cross members 103 serve to support the main driving motor 104 and a pair of variable speed transmissions 105 and 106. The motor 104 carries a pulley (Figure 2) 107, which drives a pulley 108 upon the variable speed transmission 105 by means of the belt 109. The pulley 108 is mounted upon a shaft 110 which serves as the in-put shaft of the variable speed transmission 105, the out-put shaft 111 of which carries the sprocket 112 (Figure 1), around which passes the sprocket chain 113 forming a driving connection with the sprocket 114 upon the in-put shaft 115 of the variable speed transmission 106.

The in-put shaft 115 on its opposite end carries the sprocket 116. The latter is drivingly interconnected with the sprocket 117 by the sprocket chain 118. The hub of the sprocket 117 is fixedly connected to the hub of the sprocket 119, but the whole is arranged to rotate loosely upon the out-put shaft 120 of the variable speed transmission 106. The sprocket 119 is interconnected with the sprocket 121 upon the in-put shaft 122 of the variable speed transmission 123 by means of the sprocket chain 124. The in-put shaft 122 likewise carries the sprocket 125 (Figures 2 and 4), which is interconnected with the sprocket 126 on the in-put shaft 127 of the enrichment conveyor variable speed transmission 128 through the sprocket chain 129 (Figure 2).

This in-put shaft 127 at its opposite end carries a sprocket 130 interconnected with the sprocket 131 on the input shaft 132 of the enrichment conveyor variable speed transmission 133 by means of the sprocket chain 134. The out-put shafts 135 and 136 of the enrichment conveyor variable speed transmissions 128 and 133 are provided with sprockets 137 and 138 (Figure 2), having sprocket chains 139 and 140 leading to the sprockets 141 and 142, mounted upon the drive shafts 9 of the two enrichment conveyors 12 (Figures 2, 5 and 7). In this manner the enrichment conveyors 12 are driven from the main driving motor 104, and their speeds are adjustably regulated individually as well as collectively through the different variable speed transmissions. The out-put shaft 143 of the variable speed transmission 123 (Figure 2) carries a sprocket 144 having a sprocket chain 145 leading to the sprocket 146 upon the shaft 27, driving the dough conveyor 18 (Figures 2 and 5), in the manner previously described.

The out-put shaft 120 of the variable speed transmission 106 carries the sprocket 150, having the sprocket chain 151 meshing with the sprocket 152 mounted upon the shaft 153. The shaft 153 carrying the sprocket 152 is journalled in the bearing brackets 160, and carries the bevel pinion 161. The latter meshes with the bevel gear 81 mounted upon and driving the hopper drive shaft 75, in the manner previously described.

Consolidating rolls

The dough-laminating conveyor 18 (Figure 7) discharges the sheet or strip of laminated dough into the space between the upper and lower consolidating rolls 170 and 171, mounted upon the shafts 172 and 173, respectively. The roll shafts 172 and 173 (Figure 5) are journalled in the bearing blocks 174 and 175, respectively, these being arranged within the rectangular apertures 176 of the consolidating roll-supporting brackets 177. The latter are secured to the frame up-rights 80. The lower consolidating roll bearing block 175 is fixed in position and rests upon the member 178, whereas the upper bearing block 174 is slidable within the aperture 176, this sliding being controlled by the screw shafts 179 secured thereto. The screw shafts 179 for the bearing blocks 174 at the opposite ends of the roll shaft 172 are interconnected by bevel gearing (not shown), operated by the hand wheel 180 upon the shaft 181 rotatably mounted in the brackets 182 (Figure 7) upon the upper end of the consolidating roll support bracket 177. By this mechanism the space between the consolidating rolls 170 and 171 may be accurately adjusted.

The consolidating rolls 170 and 171 are driven from the shaft 153 in the upper left-hand corner of Figures 5 and 7, the driving connections of this shaft 153 having been previously described. The shaft 153 carries a sprocket 183 (Figures 5 and 7), having the sprocket chain 184 driving the sprocket 185 mounted upon the end of the lower roll shaft 173. The opposite end of the shaft 173 (Figure 5) carries a sprocket 186, which has a sprocket chain 187 communicating power to the sprocket 188 upon the roller shaft 189. The latter is operative to drive the first dough transfer conveyor, the construction of which is subsequently to be described.

Dough-transfer conveyor

In the machine of our copending application, Serial No. 43,246, filed October 2, 1935, of which this is a division, there are disclosed four dough-transfer conveyors the first of which is arranged immediately beyond the consolidating rolls 170 and 171. The first dough-transfer conveyor 195 (Figure 7) consists of a belt, similar to the dough-laminating conveyor 18 and similarly supported upon the opposite end rolls 196 and 197, respectively, (Figures 7 and 8). The upper end roll 197 is journalled in the bearing blocks 198, slidably mounted in the rectangular apertures 199 of the dough-transfer conveyor framework 200. The bearing blocks 198 may be moved to and fro to tighten or loosen the dough-transfer conveyor 195 by turning the screw shafts 201 secured to the bearing blocks 198. The dough-transfer conveyor 195, during the upper part of its travel, rests upon the bed plate 202, which in turn, is supported by the framework 200. The dough-transfer conveyor 195, along the lower part of its travel, passes around the rollers 203, 204, 205 and 206, mounted respectively upon the roller shafts 207, 208, 189 and 210, in much the same manner as the dough-laminating conveyor 18, previously described.

On the end of the roller shaft 208 is mounted a pinion 211 (Figure 6), meshing with a similar pinion 212 mounted upon the end of the roller shaft 207. The pinion 212 meshes with a pinion 213 upon the shaft 214, and the latter meshes with a pinion 215 upon the end of the roller shaft 210. The pinion 215 meshes with a pinion 216 mounted upon the roller shaft 189, the latter being driven by the sprocket 188 from the sprocket chain 187, in the manner previously described.

Operation

In the operation of the machine of this invention, the dough batch is deposited in the dough hoppers 4 through the filling apertures 41 (Figures 1 and 4). At the same time the enrichment materials are placed in the enrichment hoppers 5 through the filling apertures 42. The dough passes downwardly between the feeding rolls 55 and 56 (Figure 7) of each hopper and deposits itself upon the dough-laminating conveyor 18. The dough from the right-hand hopper 4, in Figure 1, moves along this conveyor until it comes beneath the left-hand end of the right-hand enrichment conveyor 12, which deposits its charge of enrichment materials upon the sheet of dough coming from the first dough hopper 4.

The dough sheet with its layer of enrichment thereon then passes beneath the middle dough hopper 4, where a second sheet of dough is superimposed thereon, covering the enrichment layer. The compound dough sheet thus formed continues to move on the conveyor 18 beneath the left-hand enrichment conveyor 12 until it arrives at a point beneath the left-hand end thereof, where the second layer of enrichment is deposited thereon. Moving onward, the compound dough sheet, now composed of two layers of dough and two layers of enrichment, moves beneath the third dough hopper 4, where a third dough layer is superimposed upon the second enrichment layer. The whole sheet then passes beneath the consolidating rolls 170 and 171, which press the layers together evenly. The upper roll 170 is mitred at its ends, and presses down the edges of the dough to seal them.

The dough sheet is then deposited upon the first dough-transfer conveyor 195, upon which it moves upwardly to the succeeding apparatus.

We desire to comprehend within our invention such modifications as may be embraced within our claims and the scope of our invention.

Having thus fully described the invention, what is claimed as new and desired to be secured by Letters Patent, is:

1. A dough-preparing machine comprising a pair of dough holders, an enrichment material holder arranged therebetween, a main conveyor arranged beneath said dough holders to receive the dough coming therefrom, an auxiliary conveyor associated with said enrichment material holder, one of said dough holders being arranged to deposit a layer of dough upon the main conveyor, said auxiliary conveyor being arranged subsequently to deposit a layer of enrichment material from said enrichment material holder upon said dough layer and the other dough holder being arranged thereafter to deposit a second layer of dough upon said enrichment material layer, and means for imparting a substantially constant thickness to the thus laminated dough.

2. A dough-preparing machine comprising a pair of dough holders, an enrichment material holder arranged therebetween, a main conveyor arranged beneath said dough holders to receive the dough coming therefrom, an auxiliary conveyor associated with said enrichment material holder, one of said dough holders being arranged to deposit a layer of dough upon the main conveyor, said auxiliary conveyor being arranged subsequently to deposit a layer of enrichment material from said enrichment material holder upon said dough layer and the other dough holder being arranged thereafter to deposit a second layer of dough upon said enrichment material layer, means for imparting a substantially constant thickness to the thus laminated dough, and means associated with said enrichment material holder and said auxiliary conveyor for regulating the thickness of the layer of enrichment material deposited upon said auxiliary conveyor.

3. A dough-preparing machine comprising a pair of dough holders, an enrichment material holder, a main conveyor, one of said dough holders being arranged to deposit a layer of dough upon said main conveyor to form a substantially continuous sheet, mechanism for actuating said main conveyor adapted to move the dough layers, and an auxiliary conveyor positioned beneath said enrichment material holder and arranged to deposit a layer of enrichment material upon the moving layer of dough on said main conveyor, the other dough holder being arranged to deposit a second layer of dough upon said enrichment material layer.

4. A dough-preparing machine comprising a pair of dough holders, an enrichment material holder, a main conveyor, one of said dough holders being arranged to deposit a layer of dough upon said main conveyor to form a substantially continuous sheet, mechanism for actuating said main conveyor adapted to move the dough layers, an auxiliary conveyor positioned beneath said enrichment material holder and arranged to deposit a layer of enrichment material upon the moving layer of dough on said main conveyor, said auxiliary conveyor moving in a direction parallel with said main conveyor, the other dough holder being arranged to deposit a second layer of dough upon said enrichment material layer.

KENNETH D. LOOSE.
CHARLES W. WATKINS.
JOSEPH W. GREEN.